(12) United States Patent
Yang et al.

(10) Patent No.: US 6,577,586 B1
(45) Date of Patent: Jun. 10, 2003

(54) CLAMPING APPARATUS FOR CLAMPING A DISK IN A DISK DRIVE

(75) Inventors: Jeong Yeol Yang, Kunpo (KR); Han Baek Lee, Pyungtaek (KR); Yong Bom Kim, Cheonan (KR); In Gi Cheon, Seoul (KR); In Ho Lee, Euiwang (KR)

(73) Assignee: LG Electronics Inc., Seoul (KR)

( * ) Notice: Subject to any disclaimer, the term of this patent is extended or adjusted under 35 U.S.C. 154(b) by 185 days.

(21) Appl. No.: 09/617,429

(22) Filed: Jul. 14, 2000

(30) Foreign Application Priority Data

| Jul. 14, 1999 | (KR) | 99-28524 |
| Jul. 14, 1999 | (KR) | 99-28525 |
| Jul. 14, 1999 | (KR) | 99-28531 |
| Jul. 14, 1999 | (KR) | 99-28532 |
| Jul. 14, 1999 | (KR) | 99-28533 |
| Jul. 14, 1999 | (KR) | 99-28539 |
| Jul. 14, 1999 | (KR) | 99-28541 |

(51) Int. Cl.$^7$ .................................................. G11B 3/70
(52) U.S. Cl. ................................................... 369/270
(58) Field of Search .............................. 369/270, 77.1, 369/75.2

(56) References Cited

U.S. PATENT DOCUMENTS 4,413,294 A * 11/1983 Beijer ..................... 360/99.05
4,697,259 A * 9/1987 Takanashi ................. 369/75.2

* cited by examiner

*Primary Examiner*—David Davis
(74) *Attorney, Agent, or Firm*—Birch, Stewart, Kolasch & Birch, LLP

(57) ABSTRACT

A clamping device of a disk drive including a driving source, a driving member rotated by the driving force of the driving source; a clamping member for clamping a disk while being ascended and descended by virtue of a rotation movement of the driving member; a clamping member ascending and descending unit for switching the rotation movement of the driving source to ascending and descending movement of the clamping member, and elastically supporting the disk on a turntable while the disk is being mounted on the turntable; and an elastic press member installed on the upper surface of the driving member, for pressing the clamping member in the direction where the disk is positioned. The elastic support arm, which is thin and has a desirable restoring force, is driven by the rotation movement of the clamp driving member, thereby ascending and descending the clamper. Thus, the overall construction is thin, light and small as well as ensuring the firm and reliable clamping of the disk. In addition, during the clamping operation, the disk is mounted on the turntable more accurately, and by having a construction that one of support pieces of the elastic support arms is installed higher than the others, force is sequentially transferred to the clamper, rather than being transferred suddenly, so that its process is performed smoothly.

15 Claims, 9 Drawing Sheets

CLAMPING APPARATUS FOR CLAMPING A DISK IN A DISK DRIVE

BACKGROUND OF THE INVENTION

1. Field of the Invention

The present invention relates to a clamping device of a disk drive and a method for supporting the disk drive, and more particularly, to a clamping device of a disk drive which is capable of implementing a light, thin and small disk drive, ensuring a reliable clamping of a disk and a smooth unclamping.

2. Description of the Background Art

Generally, a clamping device is provided to a disk drive to prevent the disk from releasing from a turntable when the disk is rotated.

Figure 1:
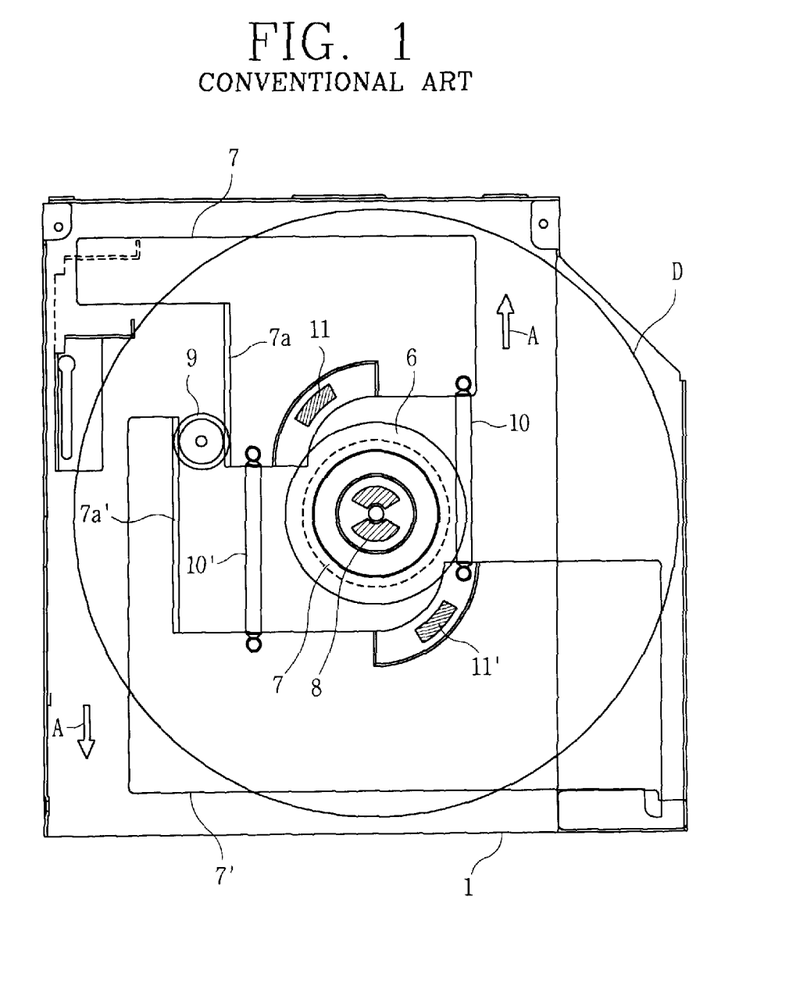
FIG. 1 is a plan view of a disk drive having a clamping device in accordance with the conventional art.
Figure 2:
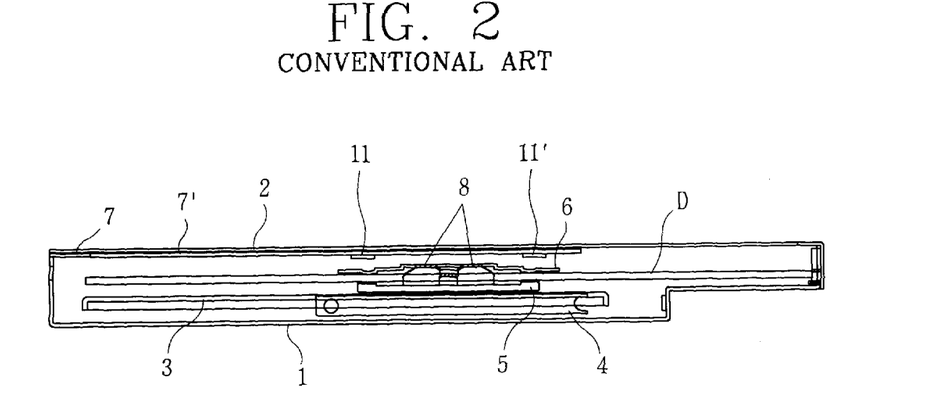
FIG. 2 is a front sectional view of the disk drive having a clamping device in accordance with the conventional art.

FIG. 1 is a schematic plan view of a disk drive having a clamping device and FIG. 2 is a schematic front sectional view of the disk drive having a clamping device in accordance with the conventional art.

As shown in the drawings, a main chassis 1 and an upper chassis 2 attached to the upper portion of the main chassis 1 constitute the inner part and the outer part of the disk drive. On the main chassis 1, there are installed a pick-up base 3, a pick-up assembly 4 and a turntable 5 on which a disk 'D' is mounted to be rotated.

On the upper portion of the turntable 5, there is also provided a damper 6 for fixing the disk 'D' mounted on the turntable 5. The damper 6 is normally (in an unclamping state) supported by a first and a second damper holders 7 and 7' installed at the lower surface of the upper chassis 2.

Magnets 11 and 11' are installed at a predetermined portion of the first and the second damper holders 7 and 7', so that the damper 6 is held by the magnetic force of the magnets 11 and 11' when the disk is unclamped.

A magnet 8 is attached at the center of the lower surface of the damper 6 so as to be magnetically attached to the turntable 5.

The first and the second damper holders 7 and 7' receive driving force from a gear 9 that is rotated by a driving source, for which rack gear units 7a and 7a' are engaged with the gear 9 in a facing manner in the first and the second damper holders 7 and 7'.

Restoration springs 10 and 10' elastically connect the first and the second damper holders 7 and 7' together, to allow the first and second damper holders 7 and 7' to their original positions upon unclamping.

The operation of the clamping device of the conventional art constructed as described above will now be explained.

Immediately when the disk 'D' is mounted on the turntable 5, the gear 9 is rotated upon receipt of driving force from the driving source, according to which the first and the second damper holders 7 and 7' respectively move in the opposite direction as indicated by the arrows shown in FIG. 1, going away from each other.

As the damper holders 7 and 7' move, the magnets 11 and 11' installed at the lower surfaces thereof are accordingly moved to release the damper 6. Then, the damper 6 is lowered from the attachment by the magnets 11 and 11' and is attached to the turntable 3 by the magnetic force of the magnet 8 of the turntable 3 so that it prevents the disk 'D' from deviating off the turntable 3 when the disk 'D' is rotated.

However, the clamping device of the conventional art has the following problems.

First, in case where the disk drive is vertically installed for use, the damper 6 is not properly operated.

In a vertically installed disk drive, when the damper 6 is released from the attachment to the damper holders 7 and 7' to hold the disk 'D', it is bound to fall due to gravity. In this respect, the damper 6 is not accurately placed in line with the central hole of the disk, and its operation is not properly performed.

In addition, as the rotation speed of the disk drive is increased as technology advances, the centrifugal force generated during the rotation of the disk 'D' becomes so strong that the method for holding the disk 'D' only by virtue of the magnetic force of the magnet 8 is not reliable.

Meanwhile, in an effort to resolve the problem, a mechanical construction has been proposed in that the damper is raised to hold the disk. However, employment of such mechanical construction inevitably defies the concept of a light, thin and small construction of the disk drive.

SUMMARY OF THE INVENTION

The present invention is to provide a clamping device of a disk drive which is capable of implementing a light, thin and small disk drive, ensuring a reliable clamping of a disk as well as smooth unclamping of the disk.

The present invention also provides a clamping device of a disk drive that ensures an accurate operation no matter how a disk drive is oriented and installed for use.

As embodied and broadly described herein, there is provided a clamping device of a disk drive including: a driving source, a driving member rotated by the driving force of the driving source; a clamping member for clamping a disk while being ascended and descended by virtue of a rotation movement of the driving member; and a clamping member ascending and descending unit for switching the rotation movement of the driving source to ascending and descending movement of the clamping member, and elastically supporting the disk on a turntable while the disk is being mounted on the turntable.

Referring to the driving member, guide pins installed at predetermined intervals on the upper chassis are positioned in guide slots formed with a predetermined curvature on the driving member, so that the driving member is rotated by the driving force transferred from the driving source.

The clamping member ascending and descending unit includes an elastic bent portion of which one end is coupled to the driving member, and being extended from the one end in a bent form to have elasticity; a support piece extended form the elastic bent portion to help mount the disk on the turntable; and a guide piece formed at one side of the elastic bent portion, functioning as a cam for ascending and descending the support piece according to the rotation of the driving member. The clamping member ascending and descending unit refers to an elastic support arm that is rotated along with the driving member.

A predetermined interval guide slot is formed at the elastic bent portion of the elastic support arm. A protrusion is formed at the upper chassis corresponding to the guide slot at the movement trajectory of the elastic support arm and a sloping side is formed at the side corresponding to the guide piece, so that the protrusion is moved along within the guide slot when the elastic support arm moves and the guide piece is moved along the sloping side, rendering the support piece of the elastic support arm to be moved downwardly to thereby mount and fix the disk on the turntable.

There are provided a plurality of elastic support arms, of which one is installed at a higher position than the others.

An elastic press member is additionally installed on the driving member to push the clamping member towards the direction where the disk is positioned. The elastic press member includes a circular body portion installed on the driving member; a press plate coupled to the body portion and pressing the clamping member; and an elastic leg for coupling the press plate to the body portion and providing elasticity to the press plate. In the body portion, a fixing piece for installing the elastic press member is provided to the guide pin formed on the upper chassis for guiding the movement of the driving member. The fixing piece is fixed at the driving member by the elasticity of the body portion itself.

A plurality of fixing pieces are installed at equal intervals on the circumferential portion of the body portion. A fixing hole is formed on one fixing piece in the radial direction of the elastic press member, while a fixing hole is formed on the other remaining pieces in a circumferential direction thereof.

The fixing hole consists of an insert portion having a greater diameter than that of a head portion of the guide pin, and a fixing portion having a smaller diameter than that of the head portion of the guide pin.

A guide hole is formed at the central portion of the press plate of the elastic press member, and a guide protrusion is formed at the central portion of the clamping member, positioning within the guide hole.

There is also provided a method for mounting a disk on a turntable including: a first support step of supporting a disk by corresponding an inserted disk to the position of a turntable by means of a clamping ascending and descending member driven by a driving member that is rotated according to driving force of a driving source; a second support step of mounting the disk on the turntable by lowering the clamping member that serves to clamp the disk while ascending and descending by virtue of rotation movement of the driving member; and separating step of separating the clamping ascending and descending member from the disk to render the disk to be rotated freely.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 12A and 12B show sequential installment of the elastic press member of the clamping driving member on the upper chassis in the disk drive in accordance with the present invention, of which

DETAILED DESCRIPTION OF THE PREFERRED EMBODIMENTS

Reference will now be made in detail to the preferred embodiments of the present invention, examples of which are illustrated in the accompanying drawings.

A clamping device of a disk drive in accordance with the present invention will now be described with reference to the accompanying drawings.

Figure 3:
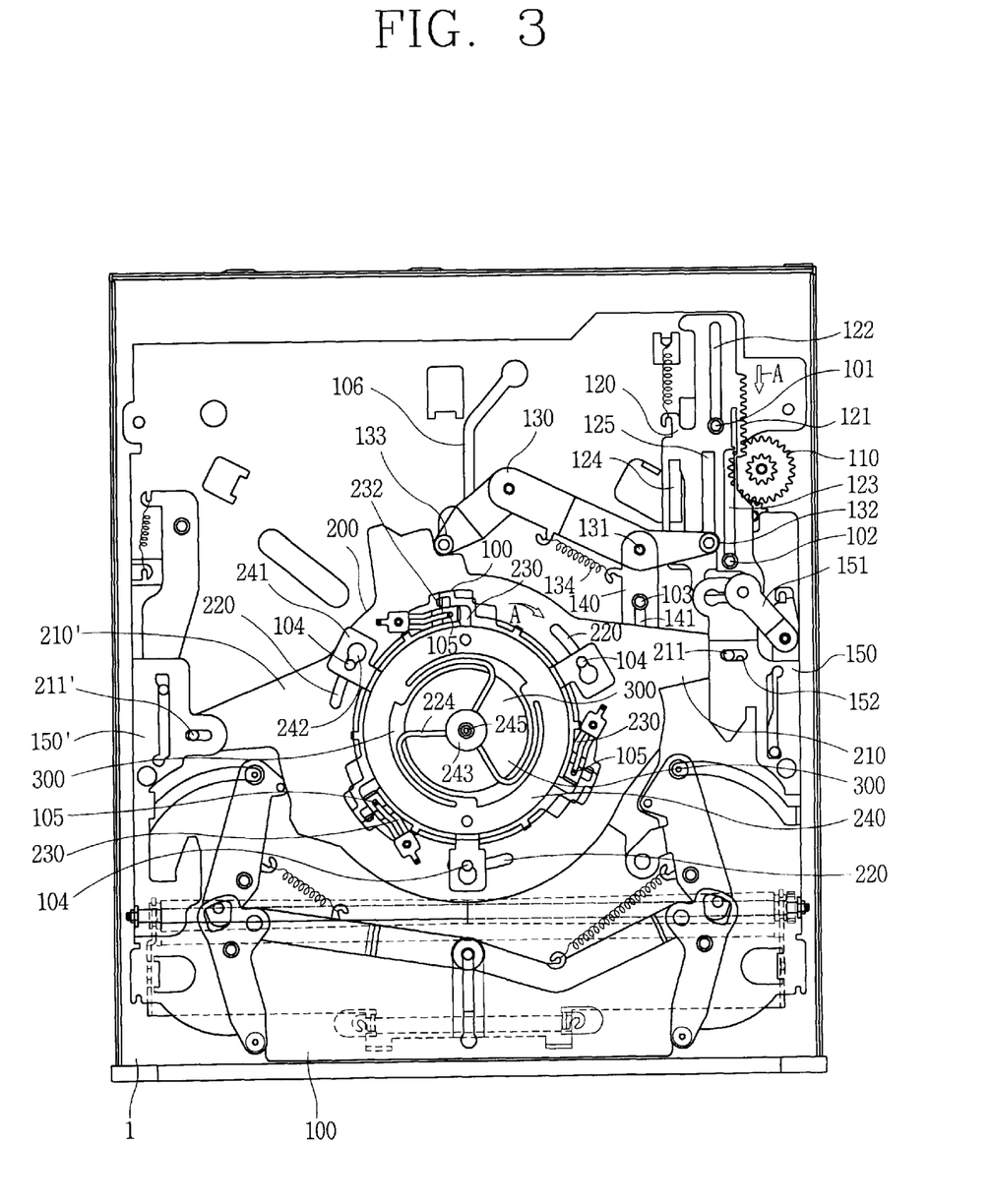
FIG. 3 is a plan view of a disk drive having a clamping device in accordance with the present invention.

FIG. 3 is a plan view of a disk drive having a clamping device in accordance with the present invention. At one side of the upper chassis 100, there are provided a driving gear 110 for providing a driving source, and a driving plate 120 driven by the driving force transmitted from the driving gear 110.

A rack portion 121 is formed on the driving plate 120 to be engaged with the driving gear 110, and a first and a second guide slots 122 and 123 are formed in a row at the central portion of the driving plate 120, to guide movement of the driving plate 120.

A first and a second guide pins 101 and 102 protrusively formed on the upper chassis 100 are positioned into the movement slots 122 and 123, allowing the driving plate 120 to move along the first and the second guide slots 122 and 123. At one side of the driving plate 120, a first and a second select slots 124 and 125 are formed to guide a support lever 130 (to be described) according to the type of disk inserted.

In this respect, the first select slot 124 guides the support lever 130 in the case of a 12-cm disk 'D', while the second select slot 125 guides the support lever 130 in the case of a 8-cm disk 'D'.

Due to the insertion of a disk into the disk drive, the support lever 130 moves the driving plate 120 so that the rack portion 121 of the driving plate 120 and the small gear portion of the driving gear 110 are engaged with each other, thereby transferring driving force for clamping of the disk 'D' to the driving plate 120.

The support lever 130 moves by pivoting on a hinge 131 which also connects to one end of a connection lever 140 (to be described). At one end portion of the support lever 130, a guide protrusion 132 is formed to be selectively positioned in a first and a second select slots 124 and 125, while the other end portion of the support lever 130 contacts with the disk inserted into the disk drive and has a support bar 133 formed thereon, being moved according to the insertion of the disk.

Here, the support bar 133 is positioned in the support bar slot 106 formed at the central upper portion of the upper chassis 100.

The support lever 130 is hingedly engaged at hinge 131 with the connection level 140. A restoration spring 134 connected between the support lever 130 and the hinge 131 allows these elements to return back to their original state.

The connection lever 140 has a movement slot 141 in which a third guide pin 103 fixed on the upper chassis 100 is inserted. The connection lever 140 moves in accordance with elements for loading the disk 'D'.

A first ascending and descending plate 150 is disposed at the lower portion of the driving plate 120, partially covering the upper and side surface of the upper chassis 100. The first ascending and descending plate 150 is connected to the driving plate 120 by the interlocking lever 151 so that the two plates are operated together.

The first ascending and descending plate 150 has a guide slot 152 allowing the transfer of the driving force to a clamping driving member (to be described).

The construction of the clamping driving member 200 for clamping the disk 'D' will now be described with reference to FIGS. 3–10.

Figure 4:
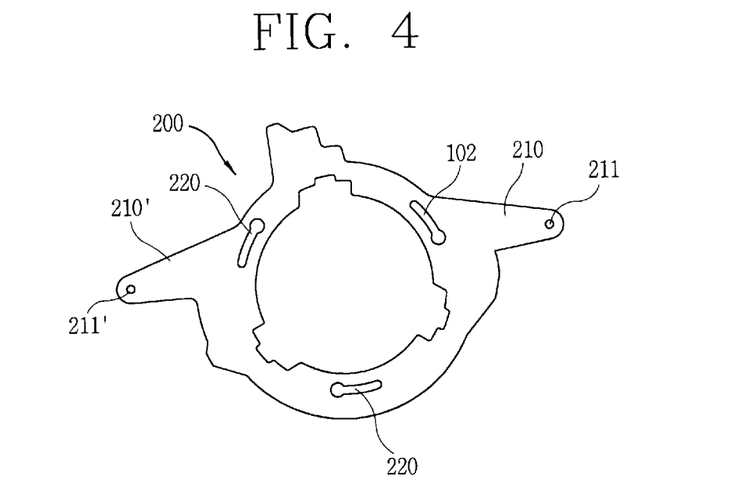
FIG. 4 is a plan view showing a construction of a clamping driving member of the disk drive in accordance with the present invention.

As shown in the FIG. 4, the clamping driving member 200 roughly has a hollow disk type structure. At opposing circumferential portion of the clamping driving member 200, a first and a second interlocking arms 210 and 210' are respectively formed. Interlocking pins 211 and 211' are formed at the end portion of the interlocking arms 210 and 210' and protrude upwardly.

As shown in FIG. 3, the first interlocking arm 210 receives driving force from the first ascending and descending plate 150. The interlocking pin 211 of the first interlocking arm 210 is positioned in a drive hole 152 of the first ascending and descending plate 150 so that it is operated according to the movement of the first ascending and descending plate 150.

Meanwhile, the second interlocking arm 210' formed at the opposite side of the first ascending and descending plate 150 is connected to a second ascending and descending plate 150' functioning in the same manner as the first ascending and descending plate 150.

A plurality of driving guide slots 220 having a predetermined curvature are formed at predetermined intervals on the clamping driving member 200. In each driving guide slot 220, each fourth guide pin 104 installed on the upper chassis 100 is received so that the clamping driving member 200 can rotate as the guide slots 220 are guided by the fourth guide pins 104.

Figure 5:
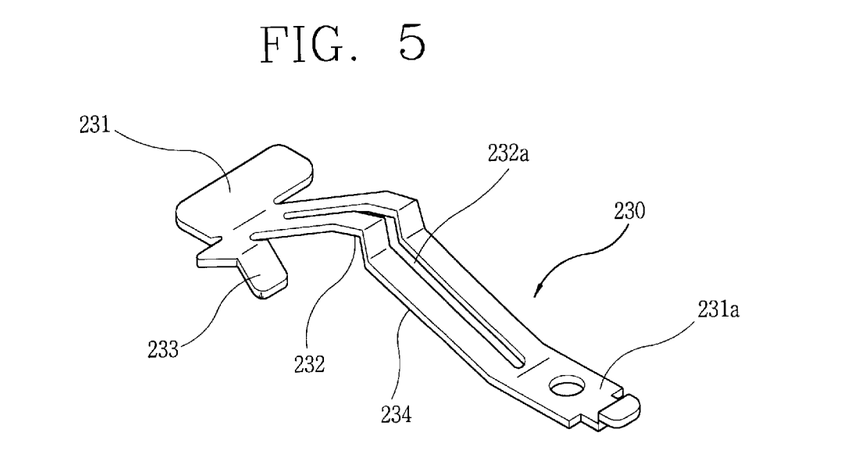
FIG. 5 is a perspective view of an elastic support arm of the clamping driving member of the disk drive in accordance with the present invention.
Figure 6:
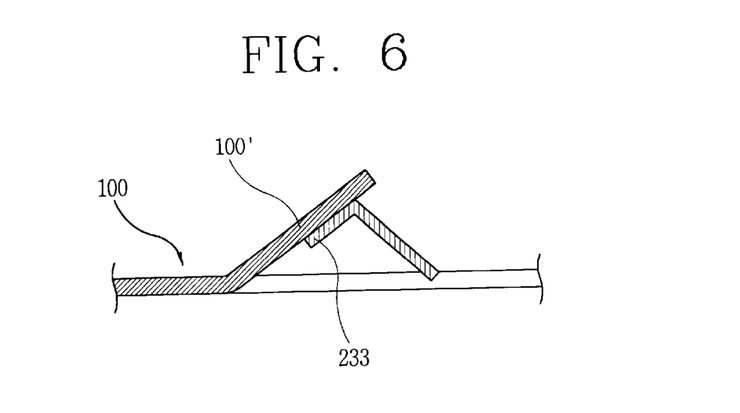
FIG. 6 is a sectional view showing a construction of the elastic support arm of FIG. 5 and the upper chassis of the disk drive in accordance with the present invention.

As shown in FIG. 5, an elastic support arm 230 is installed at predetermined inner circumferential portion of the clamping driving member 200.

The elastic support arm 230 includes one end portion 231a which connects to the clamping driving member 200, an elastic bent portion 232 extended from the one end portion and having a guide slot 232a at its central portion, and a support piece 231 extending from the elastic bent portion 232 and fixing the disk mounted on the turntable.

A guide piece 233 is formed at one side of the elastic bent portion 232, functioning as a cam that allows the support piece 231 to move vertically.

That is, as the guide piece 233 is moved by the driving of the clamping driving member 200, it contacts a sloping side 100' formed at the upper chassis 100 and moves therealong, varying the vertical movement of the support piece 231, so that it helps the disk to be fixedly mounted on the turntable (not shown) by pressing the disk before the damper 300 clamps the disk.

Figure 7:
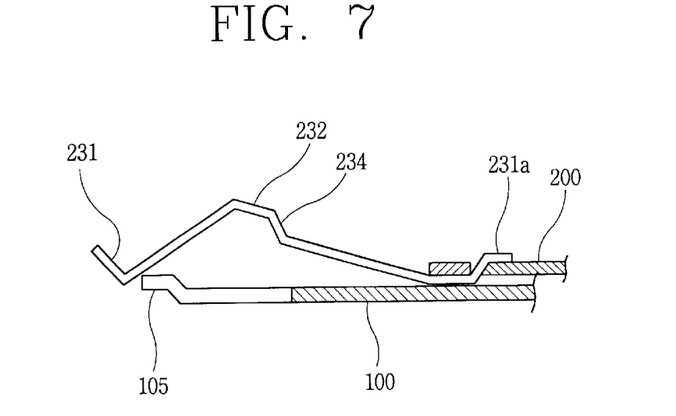
FIG. 7 is a view showing a state before operation of the elastic support arm of the disk drive in accordance with the present invention.

As shown in FIG. 3, a protrusion 105 is formed on the upper chassis 100 at the position corresponding to each guide slot 232a of the elastic bent portion 232 and the support piece 231, whereby elastic force presses the support arm 230 in the downward direction when a disk is not being clamped as shown in FIG. 7.

Figure 8A:
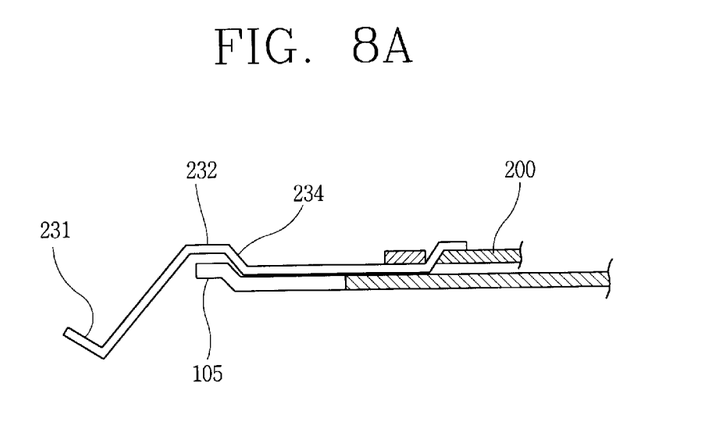
FIGS. 8A and 8B are views showing an operation of the elastic support arm of the disk drive in accordance with the present invention.
Figure 8B:
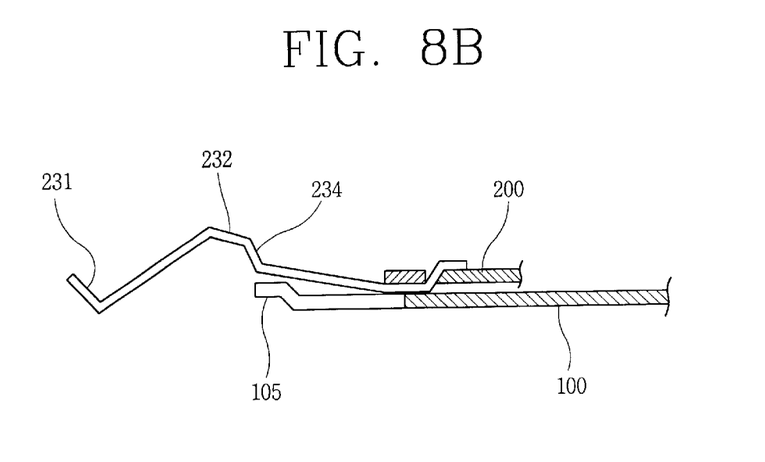

Referring to FIGS. 7, 8A and 8B, as the driving member 200 is rotated clockwise, when viewed from above the disk drive assembly, the support arms 230 are moved along with the driving member 200. The protrusion 105 is positioned into the groove where the elastic bent portion 232 and the bent potion 234 meet, as shown in FIG. 8A. The support piece 231 is moved below the upper chassis 100, whereby the support piece 231 comes into contact with the disk to thereby press the disk on the turntable (not shown).

Thereafter, the damper 300 is lowered down to press the disk on the turntable, the disk also being held in place on the turntable at the hole formed at the central portion of the disk, rendering the disk to be maintained on the turntable in a fixed manner.

When the driving member 200 further rotates clockwise, the support arms 200 move further and as the bent portion 234 abuts the protrusion 105, the bent portion 234 is raised up from the disk pressing position shown in FIG. 8A, by which the support piece 231 is raised from the disk to allow rotation of the disk during recording and playback (refer to FIG. 8B).

In this respect, one of the support pieces 231 of the plurality of elastic support arm 230 is installed higher than the other remaining ones. The reason for this is to sequentially apply pressure to the damper 300, rather than applying abrupt pressure to the disk, at a time when the damper 300 is released from the turntable (not shown).

Figure 9:
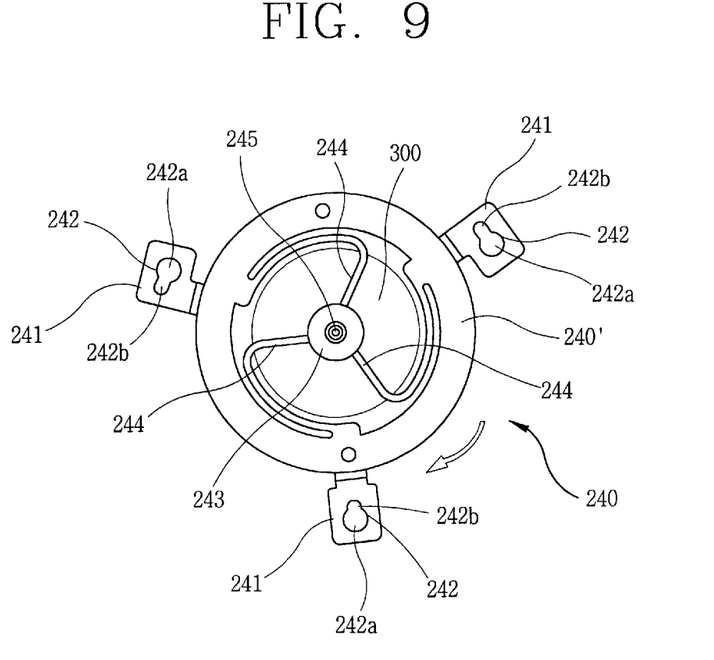
FIG. 9 is a plan view of an elastic press member of the disk drive in accordance with the present invention.

Meanwhile, an elastic press member 240 of FIG. 9 is connected with the clamping driving member 200, to press the damper 300 towards the turntable, that is, downwardly, when the damper 300 is clamping the disk.

As shown in FIG. 9, the elastic press member 240 includes a body portion 240' in a circular form and fixing pieces 241 formed at about 120° intervals at the outer circumference thereof. The fixing piece 241 includes a fixing hole 242 into which the fourth guide pin 104 positioned in the driving guide slot 220 of the clamping driving member 200 on the chassis 100 is inserted.

The fixing hole 242 consists of an insert portion 242a having a greater diameter than that of the head portion of the fourth guide pin 104 and a fixing portion 242b having a smaller diameter than that of the head portion of the guide pin 102.

One of the fixing holes 242 of the fixing pieces 241 is formed in the radial direction of the elastic press member 240, while the others are formed in the circumferential direction of the elastic press member 240. The fixing pieces 241 are to extend below the body portion 240'. The reason for this is to fix the elastic press member 240 to the fourth guide pin 104 by virtue of only its own elasticity without requiring any other fixing members such as a washer.

Figure 11:
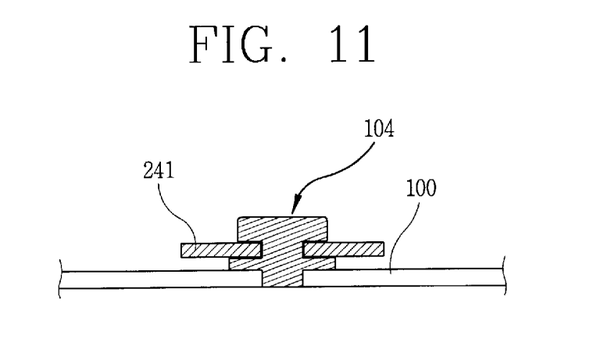
FIG. 11 is a sectional view showing installment of a guide pin for guiding movement of a clamping driving plate of the clamping driving member on the upper chassis in the disk drive in accordance with the present invention.

The form of the fourth guide pin 104 is as shown in FIG. 11.

A press plate 243 is provided at the central portion of the elastic press member 240. The press plate 243 is supported by three elastic legs 244 formed in a thin wire form similar to a pinwheel shape.

The elastic leg 244 is formed to be twisted as going from its one end portion to the other end portion, and the portion connected to the body portion 240' is formed to be relatively higher than the portion connected to the press plate 243 so that the press plate 243 is always pressed in a downward direction.

Figure 10:
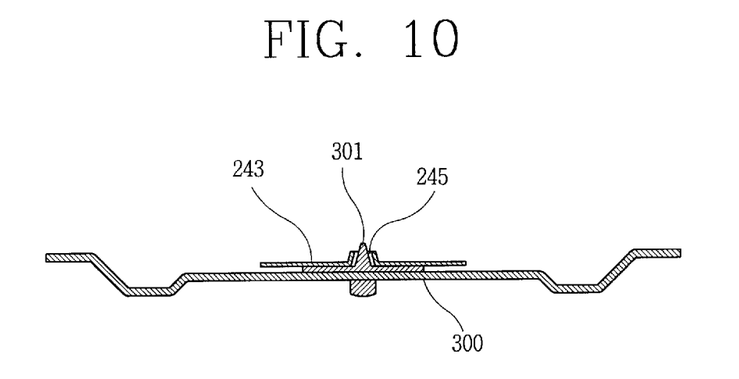
FIG. 10 is a sectional view showing interlocking of the elastic press member and the damper of the disk drive in accordance with the present invention.

A guide hole 245 is formed at the central portion of the press plate 243. As shown in FIG. 10, a guide protrusion 301 of the camper 300 is positioned into the guide hole 245, the guide hole 245 having edges protruding away from the damper 300.

The outer circumferential portions of the damper 300 are placed onto the support piece 231 of the elastic support arms 230, the damper 300 positioned above the turntable (not shown) on which the disk is mounted.

The damper 300 is normally formed in a disk shape, having the guide protrusion 301 at its central portion. The guide protrusion 301 is positioned in the guide protrusion 245 of the elastic press member 240.

As shown in FIG. 10, the guide protrusion 301 of the damper 300 has a cone form so that the interlocking between the guide protrusion 301 and the guide hole 245 can be made smoothly.

Figure 12A:
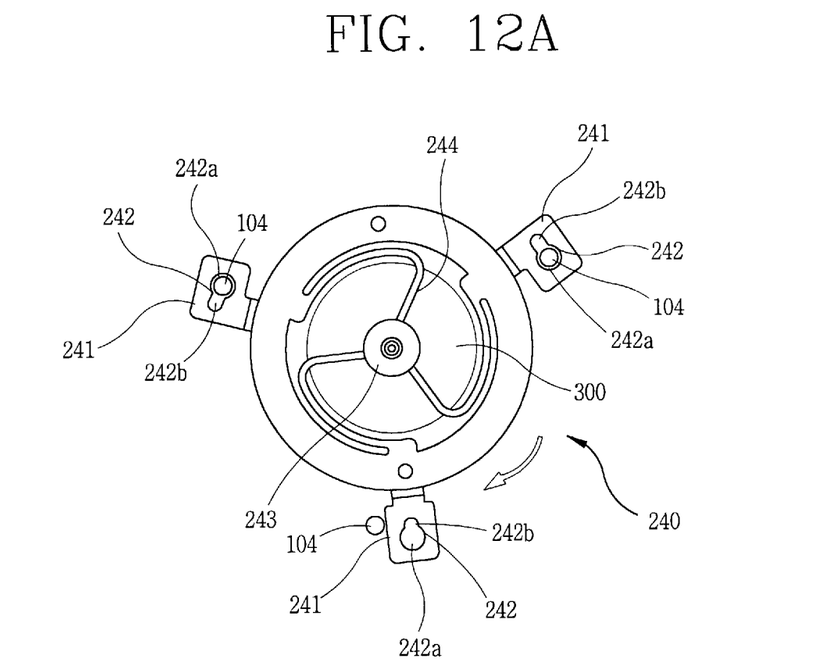
FIG. 12A shows a state before the elastic press member is installed on the upper chassis.
Figure 12B:
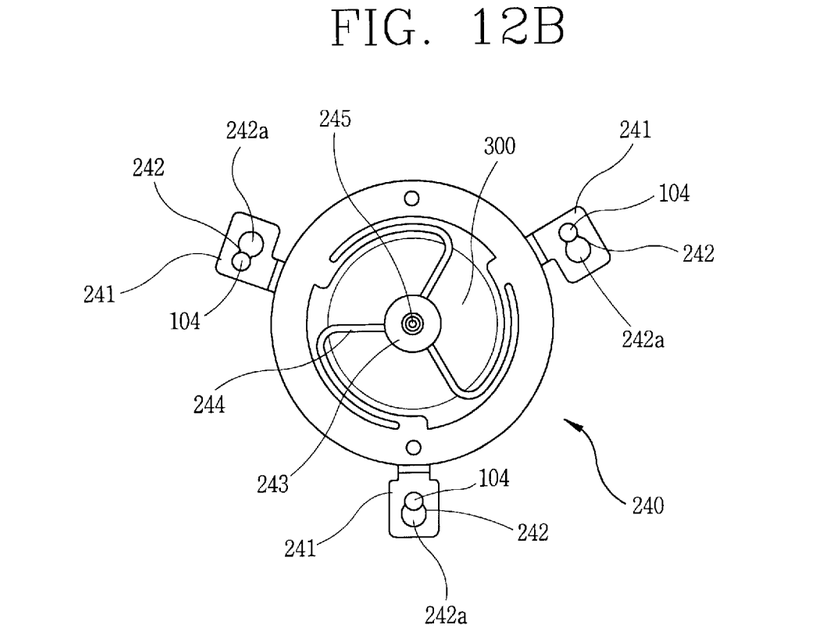
FIG. 12B shows a state after the elastic press member is installed on the upper chassis.

The process of installing the elastic press member 240 of the clamping driving member 200 at the fourth guide pin 104 of the upper chassis 100 will now be described with reference to FIGS. 11, 12A and 12B.

When connecting elastic press member 240 to the upper chassis 100, the fourth guide pin 104 is first inserted into the insert portion 242a of the circumference-directional fixing hole 242 among the fixing holes 242. Thereafter, the elastic press member 240 is rotated in the direction of arrow as shown in FIG. 12A, so that the fourth guide pin 104 can be inserted into the fixing portion 242b of the circumference-directional fixing hole 242.

Subsequently, in order to insert another fourth guide pin 104 positioned at the fixing piece 241 having the fixing hole 242 formed in the radial direction into the fixing portion 242b of the fixing hole 242, the elastic press member 240 is a bit bent to be inserted to the insert portion 242a of the fixing hole 242. And then, as the elastic press member 240 is restored to its original state with the fourth guide pin 104 being fixed at the fixing portion 242b.

Accordingly, the elastic press member 240 can be assembled and disassembled in a simple manner.

The operation of the clamping device of the disk drive in accordance with the present invention constructed as described above will now be explained with reference to FIGS. 13A, 13B, 14A, 14B, 15A and 15B.

Figure 13A:
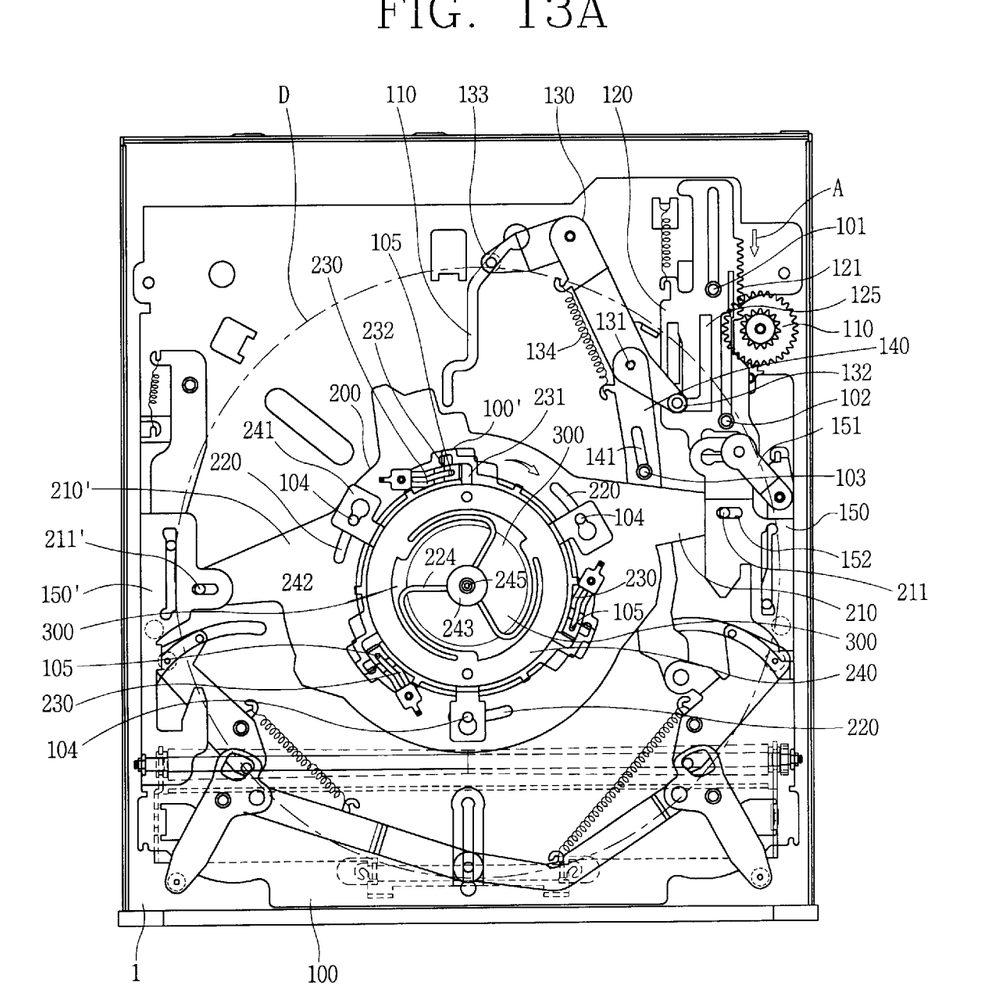
FIG. 13A is a view showing an initial state of a clamping operation by the clamping device of the disk drive in accordance with the present invention.

When the disk 'D' is inserted into the disk drive the front end of the disk 'D' contacts the support bar 133, it presses the support bar 133. Then, the guide protrusion 132 of the support lever 130 presses the driving plate 120, so that the driving plate 120 is moved.

When the driving plate 120 is moved, the rack gear 121 and the driving gear 110 which are not initially engaged with one another, gear with one another and the driving force of the drive motor (not shown) is transferred to the driving gear 110.

Thus, the driving plate 120 starts moving downwardly as shown by arrow A in FIG. 13A, according to which the first ascending and descending plate 150 is moved in the same direction of the driving plate 120 by the interlocking lever 151 that is interlocked with the driving plate 120.

When the first ascending and descending plate 150 is moved, the interlocking pin 211 of the clamping driving member 200 positioned in the drive hole 152 of the first ascending and descending plate 150 is accordingly moved, by which the clamping driving member 200 is rotated clockwise along the driving guide slots 220 having a pre-determined curvature wherein fourth guide pins 104 are inserted.

Figure 13B:
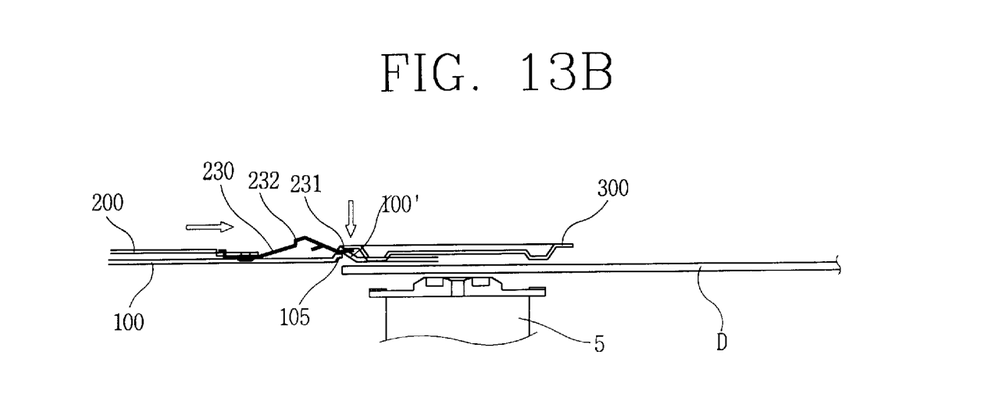
FIG. 13B is a view showing an operation state of the elastic support arm of the clamping device of FIG. 13A in accordance with the present invention.

When the clamping driving member 200 is rotated, as shown in FIG. 13B, the elastic support arm 230 installed at the clamping driving member 200 is accordingly moved. When the elastic support arm 230 is moved, the guide piece 233 is guided to contact the sloping side 100' of the upper chassis 100, so that the support piece 231 of the elastic support arm 230 is lowered down toward the turntable 5 (refer to FIGS. 7 and 8).

Figure 14A:
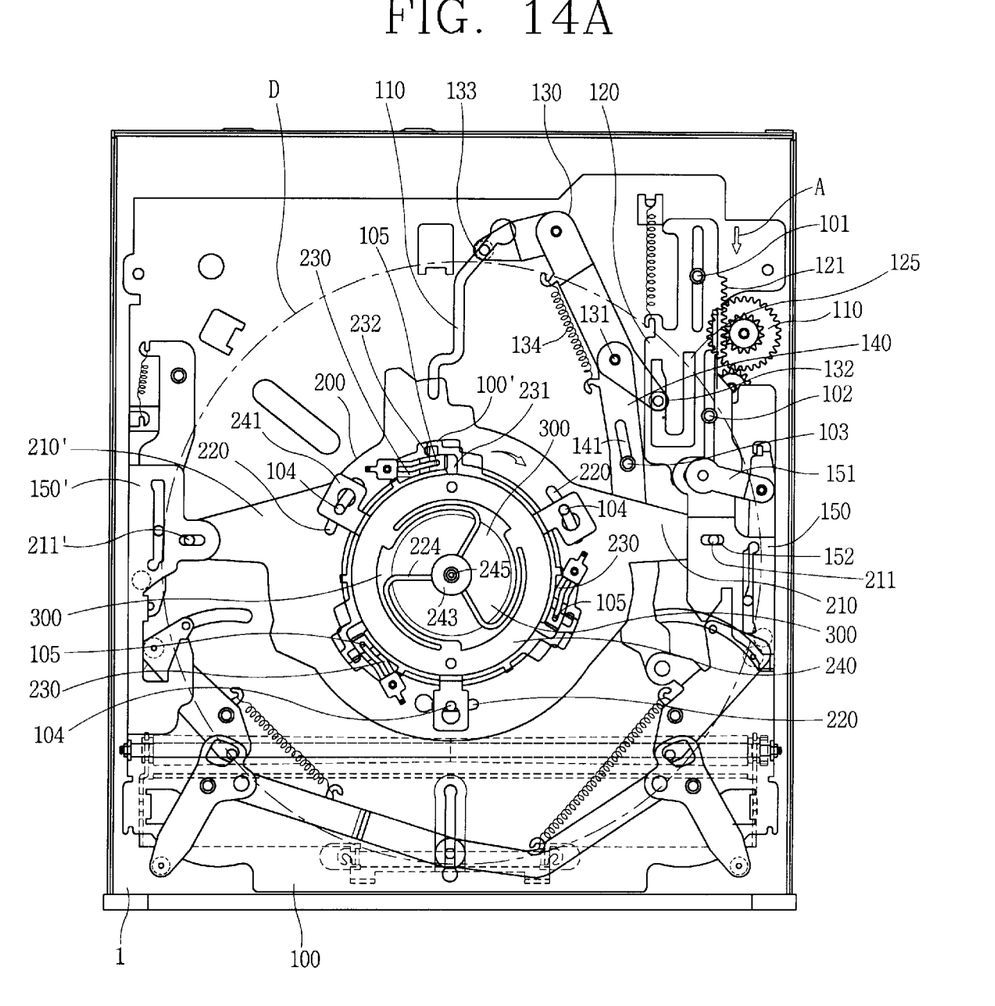
FIG. 14A is a view showing a middle state of a clamping operation by the clamping device of the disk drive in accordance with the present invention.
Figure 14B:
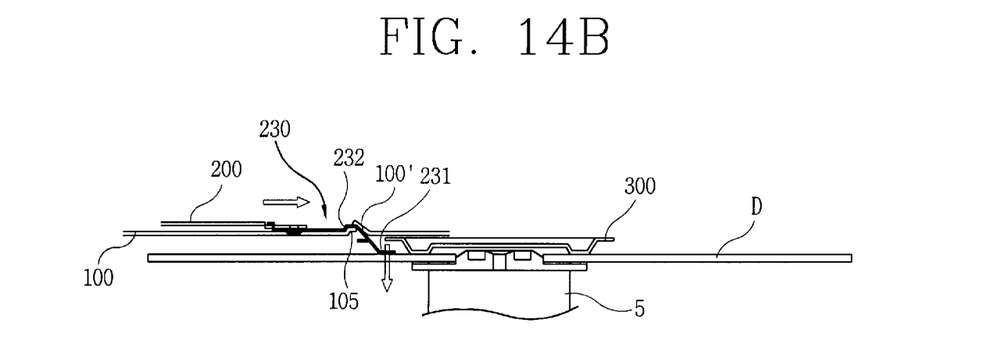
FIG. 14B is a view showing an operation state of the elastic support arm of the clamping device of FIG. 14A in accordance with the present invention.

In this state, as shown in FIGS. 14A and 14B, while the clamping driving member 200 is being moved, when the elastic bent portion 232 of the elastic support arm 230 is positioned at the protrusion 105, the elastic support arm 230 is elastically moved downwardly, according to which the support piece 231 is moved downwardly, so that its lower face presses down the surface of the inserted disk 'D'. Accordingly, the disk 'D' is firmly mounted on the turntable 5 by the support piece 231.

Figure 15A:
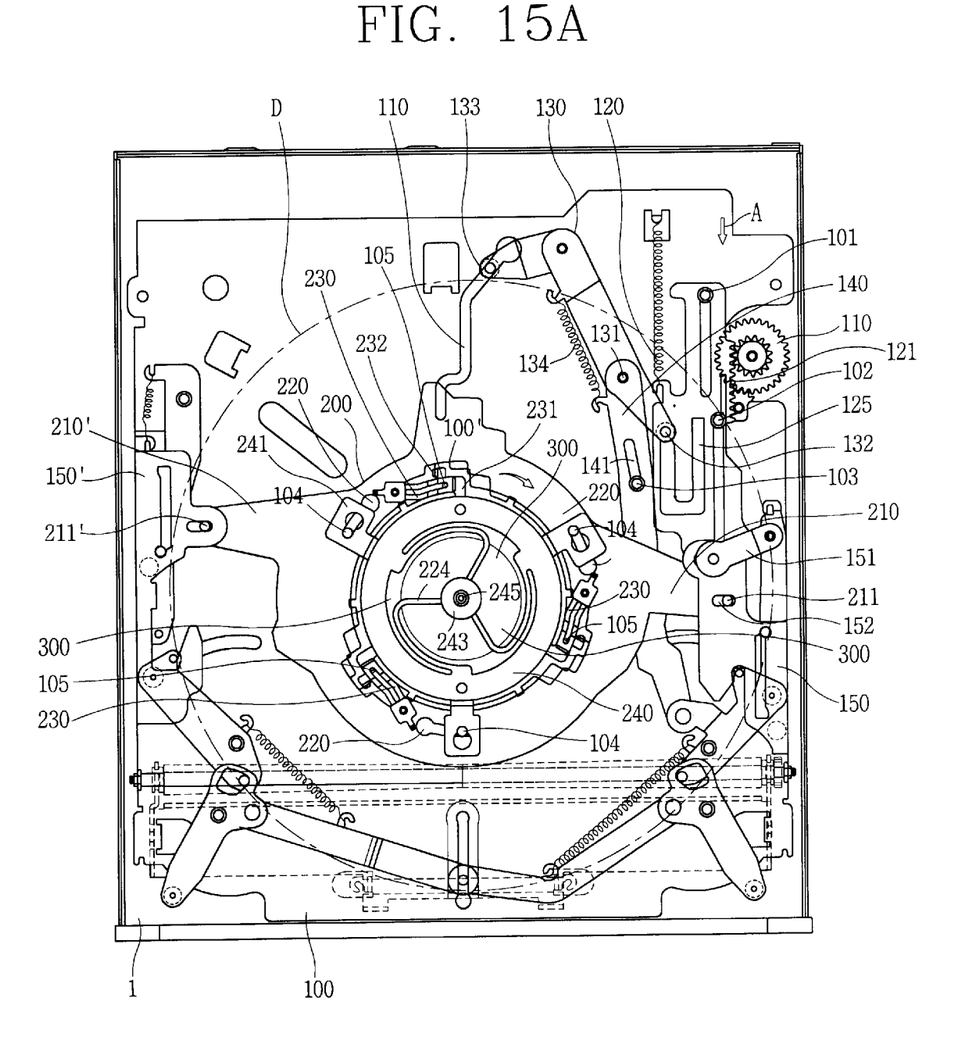
FIG. 15A is a view showing a completion state of the clamping operation by the clamping device of the disk drive in accordance with the present invention.
Figure 15B:
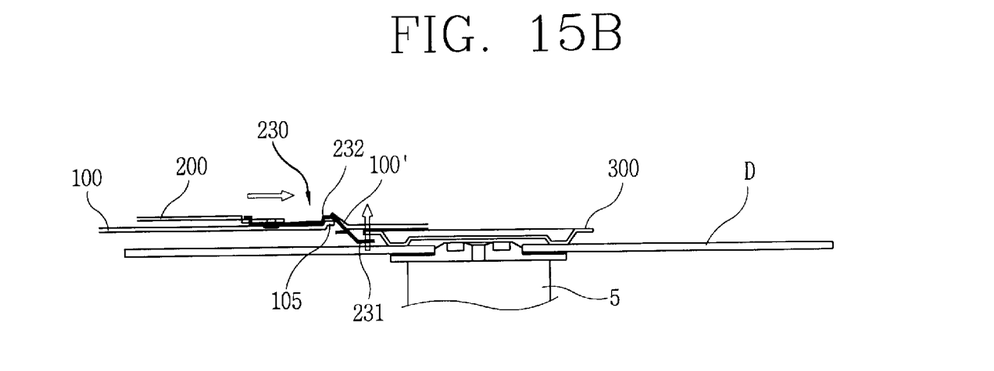
FIG. 15B is a view showing an operation state of the elastic support arm of the clamping device of FIG. 15A in accordance with the present invention.

When the clamping driving member 200 keeps rotating, as shown in FIGS. 15A and 15B, the bent portion 234 of the elastic support arm 230 is released from the protrusion 105 as the bent portion 234 abuts the protrusion 105, rendering the support piece 231 to be raised up to be separated from the surface of the disk 'D', so that the disk may freely rotate (refer to FIG. 8B).

Meanwhile, the damper 300 is lowered down to support the disk 'D' mounted on the turntable 5, and at this time, the support pieces 231 do not touch the surface of the disk 'D'.

Thereafter, as shown in FIG. 10, the damper 300 is elastically supported by the press plate 243 of the elastic press member 240, and the guide protrusion 301 of the damper 300 is positioned at the guide hole 245 of the press plate 243, so that the damper 300 is accurately positioned at the proper position. Here, the elastic press member 240 ensures a smooth operation of the disk drive when it is vertically positioned.

And, when the damper 300 is released to unload the disk 'D', the clamping driving plate 200 is reversely rotated and the operations are performed in the reverse order to those performed during loading.

In this respect, one of the support pieces 231 of the elastic support arm 230 is installed to be relatively higher than the others, so that when the support pieces 231 are raised according to the operation of the clamping driving member 200, one support piece 231 first pulls up the clamp 300 and then the other support pieces 231 successively pull up the clamp 300 to completely raise the clamp 300 off of the disk.

Accordingly, when unclamping, no sudden force is applied to the damper 300, and the ascending operation of the damper 300 is smoothly performed.

As so far described, according to the disk clamping device of the disk drive of the present invention, the elastic support arm, which is thin and has a desirable restoring force, is driven by the rotation movement of the clamp driving member, thereby ascending and descending the clamper. Thus, the overall construction is thin, light and small as well as ensuring the firm and reliable clamping of the disk.

In addition, during the clamping operation, the disk is mounted on the turntable more accurately, and by having a construction that one of support pieces of the elastic support arms is installed higher than the others, force is sequentially transferred to the clamper, rather than being transferred suddenly, so that its process is performed smoothly.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A clamping device of a disk drive comprising:
   a chassis;
   a driving source attached to the chassis to rotate a driving member;
   a clamping member to clamp a disk being ascended and descended by virtue of a rotation movement of the driving member; and
   a clamping member ascending and descending unit to switch the rotation movement of the driving source to a vertical movement of the clamping member, to elastically support the disk on a turntable, wherein the clamping member ascending and descending unit comprises:
      a plurality of elastic support arms, of which one is installed at a higher position than the others;
      an elastic bent portion having one end coupled to the driving member, and a body extending from the one end in a bent form to have elasticity;
      a support piece extending from the elastic bent portion, to help mount the disk on a turntable; and
      a guide piece formed at one side of the elastic bent portion, functioning as a cam to ascend and descend the support piece according to a rotation of the driving member, the clamping member ascending and descending unit being an elastic support arm that is rotated along with the driving member.

2. The clamping device according to claim 1, wherein the driving member has a guide slot formed thereon to receive a guide pin to allow the driving member to rotate.

3. The clamping device according to claim 1, wherein a protrusion is formed on the chassis corresponding to a movement trajectory of the elastic support arm, the protrusion urging the support piece of the elastic support arm towards the turntable when the elastic support arm is moved, so that the disk is fixedly mounted on the turntable.

4. A clamping device of a disk drive comprising:
   a chassis;
   a driving source attached to the chassis to rotate a driving member;
   a clamping member to clamp a disk being ascended and descended by virtue of a rotation movement of the driving member;
   a clamping member ascending and descending unit to switch the rotation movement of the driving source to a vertical movement of the clamping member, to elastically support the disk on a turntable; and
   an elastic press member operatively connected to the driving member to push the clamping member towards the disk, wherein the elastic press member comprises:
      a circular body portion operatively connected with the driving member;
      a press plate coupled to the body portion and pressing the clamping member; and
      an elastic leg for coupling the press plate to the body portion, and providing elasticity to the press plate.

5. The clamping device according to claim 4, wherein, in the body portion, a fixing piece for installing the elastic press member is provided to the guide pin formed on the upper chassis for guiding a movement of the driving member, the fixing piece being fixed to the driving member by elasticity of the body portion itself.

6. The clamping device according to claim 5, wherein a plurality of fixing pieces are installed at equal intervals on a circumferential portion of the body portion, and one fixing piece having a fixing hole formed in a radial direction of the elastic press member, while other fixing pieces have a fixing hole formed in a circumferential direction thereof.

7. The clamping device according to claim 6, wherein the fixing hole consists of an insert portion having a greater diameter than that of a head portion of the guide pin, and a fixing portion having a smaller diameter than that of the head portion of the guide pin.

8. The clamping device according to claim 4, wherein a central portion of the press plate of the elastic press member has a guide hole formed therein, and a guide protrusion is formed at a central portion of the clamping member to be positioned within the guide hole.

9. An optical disk clamping apparatus for an optical disk drive, comprising:
   a roller to transfer a disk inserted into the disk drive; and
   an elastic member operatively connected with the roller to elastically clamp the inserted disk on a turntable of the disk drive,
   wherein the elastic member comprises:
      a clamping driving member;
      a pressing member operatively connected with the clamping driving member; and
      a plurality of elastic supporting arms operatively connected with the clamping driving member and supporting the pressing member, the elastic supporting arms allowing the pressing member to move vertically upon rotation of the clamping driving member, the pressing member operatively pressing the turntable to secure the disk therebetween, and
   wherein the clamping driving member comprises:
      a ring shaped body with a central opening and peripheral slots;
      a pair of arms extending from opposing outer sides of the ring shaped body, the pair of arms respectively being connected with the clamping driving member; and cam portions formed on the ring shaped body between the pair of arms and the ring shaped body.

10. The apparatus of claim 9, wherein the elastic member applies sequential pressure on the disk placed on a turntable in the disk drive to thereby secure the disk.

11. An optical disk clamping apparatus for an optical disk drive, comprising:

a roller to transfer a disk inserted into the disk drive; and an elastic member operatively connected with the roller to elastically clamp the inserted disk on a turntable of the disk drive, wherein the elastic member comprises:
 a clamping driving member;
 a pressing member operatively connected with the clamping driving member; and
 a plurality of elastic supporting arms operatively connected with the clamping driving member and supporting the pressing member, the elastic supporting arms allowing the pressing member to move vertically upon rotation of the clamping driving member, the pressing member operatively pressing the turntable to secure the disk therebetween, and wherein the pressing member comprises:
 a ring shaped body;
 a plurality of elastic legs extending inwardly from the body;
 a pressing plate connected with the body via the elastic legs; and
 a plurality of fixing flaps extending outwardly from the body, the fixing flaps having an opening thereon to allow operative connection with the clamping driving member.

12. The apparatus of claim 11, wherein the pair of arms on the clamping driving member move the first lifting plate and the second lifting plate, so that a cam on the first lifting plate and a cam on the second lifting plate move the roller away from the disk.

13. An optical disk clamping apparatus for an optical disk drive, comprising:

a roller to transfer a disk inserted into the disk drive; and an elastic member operatively connected with the roller to elastically clamp the inserted disk on a turntable of the disk drive, wherein the elastic member comprises:
 a clamping driving member;
 a pressing member operatively connected with the clamping driving member; and
 a plurality of elastic supporting arms operatively connected with the clamping driving member and supporting the pressing member, the elastic supporting arms allowing the pressing member to move vertically upon rotation of the clamping driving member, the pressing member operatively pressing the turntable to secure the disk therebetween, and further comprising:
  a first lifting plate operatively connected with the roller and with the clamping driving member;
  a second lifting plate operatively connected with the clamping driving member; and
  the first and second lifting plates operating to move the roller away from the disk, while simultaneously moving the clamping driving member.

14. The apparatus of claim 13, wherein the cam portions are operatively in contact with the transferor, the cam portions moving the roller away from the disk, if the disk that has been transferred has a diameter of less than 12 centimeters.

15. An optical disk clamping apparatus for an optical disk drive, comprising:

a roller to transfer a disk inserted into the disk drive; and an elastic member operatively connected with the roller to elastically clamp the inserted disk on a turntable of the disk drive, wherein the elastic member comprises:
 a clamping driving member;
 a pressing member operatively connected with the clamping driving member; and
 a plurality of elastic supporting arms operatively connected with the clamping driving member and supporting the pressing member, the elastic supporting arms allowing the pressing member to move vertically upon rotation of the clamping driving member, the pressing member operatively pressing the turntable to secure the disk therebetween, and wherein the elastic supporting arm comprises a body portion having one end operatively connected with the clamping driving member, another end portion comprising a supporting flap and a guide flap adjacent to the supporting flap, the body portion having a guide slot and a bent portion.

\* \* \* \* \*